Nov. 14, 1939.   R. W. ERDLE   2,179,502

RETENTION MEANS FOR ARTIFICIAL TEETH, GUM SECTIONS, AND THE LIKE

Filed June 29, 1936

Inventor:
Reiner W. Erdle.

By Brown, Jackson, Boettcher & Dienner
Attys.

Patented Nov. 14, 1939

2,179,502

UNITED STATES PATENT OFFICE 2,179,502

RETENTION MEANS FOR ARTIFICIAL TEETH, GUM SECTIONS, AND THE LIKE

Reiner W. Erdle, Chicago, Ill., assignor to Dental Research Corporation, a corporation of Illinois Application June 29, 1936, Serial No. 87,951

2 Claims. (Cl. 32—10)

My invention relates to retention means for artificial teeth, gum sections and the like.

While I shall refer to the invention in connection with artificial teeth in the following general statement of the nature of the invention, it is to be understood that the invention is not to be limited to such use but may be employed in connection with gum sections and the like as will appear from the folowing detailed description and the drawing.

In attaching artificial teeth to a denture base or other tooth supporting part it is customary to provide retention means on the tooth for the purpose of fastening the same to such denture base or other tooth supporting part.

So far, there have been two general schemes for securing the desired attachment, first, by means of metal pins anchored in the porcelain tooth with the exposed ends of the pins provided with rivet heads which are embedded in the tooth supporting part and, second, by providing the tooth with a cavity which is of relatively large size and has definite undercuts and permitting the material of the denture base or other tooth-supporting part to flow into and harden in such cavity.

According to the first scheme above mentioned, as a rule two metal pins have usually been embedded in the porcelain tooth. In the past, platinum or platinum alloy pins were used and the porcelain fuse around these pins. Precious metal pin teeth, however, are not very popular for the reason that they are expensive and small checks occur in the porcelain around the pins upon firing the porcelain, thus weakening the tooth. The popular method of anchoring a metal pin in a porcelain tooth is by a soldering method. The porcelain tooth is formed with two small platinum collars in the tooth. The metal pins are soldered in these precious metal collars after the tooth has been fired.

The metal pin form of retention has the objection of requiring a relatively thick porcelain body at the place where the metal pins are anchored. Furthermore, the pin itself protrudes, and consequently adds to this already thick dimension of the tooth. This is objectionable because in many cases there is not enough space for the thick tooth and the protruding pins. The cross-section of the porcelain tooth at the place where the metal pins are anchored is a weak part in the pin tooth, and consequently pin teeth frequently break at this location. Pin teeth are glazed all over, and the smooth glazed surface does not provide a good grip for the material of the plate or other tooth supporting part, consequently the material forming the plate or other tooth supporting part at times separates or peels away from the glazed surface of the porcelain tooth and creates an unsanitary condition.

The second scheme above mentioned, namely of providing the tooth with a cavity having definite undercuts and permitting the material of the denture base or other tooth supporting part to flow into and harden in such cavity, has the objection that the large cavity weakens the tooth in proximity such cavity. If such a tooth requires considerable grinding, breakage frequently results. In addition, these teeth are also glazed on all surfaces, and at times the denture material separates or peels away from the porcelain tooth, leaving a space for food and saliva to lodge, which, of course, is undesirable.

The object of my invention is to provide an artificial tooth, gum section or the like, with improved retention means for securing satisfactory attachment to the denture base or other tooth supporting part without the metal pins and relatively large cavities about described, as well as without the disadvantages and objectionable results due to such metal pin and large cavity forms of retention.

Further objects and features and advantages of the invention will be apparent from the following detailed description taken in connection with the accompanying drawing, in which.

Figure 1:
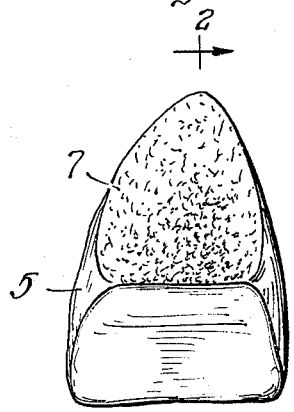
Figure 1 is a rear elevational view on an enlarged scale of an anterior tooth provided with retention means embodying the present invention.
Figure 2:
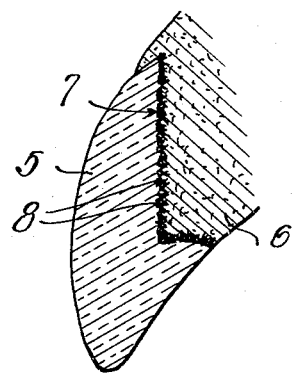
Figure 2 is a vertical section taken on the line 2—2 of Figure 1 and showing, fragmentarily, a portion of the denture base or supporting part for the tooth.

Referring first to Figures 1 and 2, the tooth structure therein illustrated comprises an anterior tooth 5 formed preferably of porcelain. A portion of a denture base, plate, or other tooth structure supporting part, is indicated fragmentarily at 6 in Figure 2. This tooth structure supporting part 6 may be formed of vulcanite, Celluloid, synthetic resin, or any other suitable or preferred material.

The tooth 5 has a surface 7 which is embedded in and anchors the tooth 5 to the base or supporting part 6. The surface 7 is roughened and of generally granular-like form to present a rough and preferably unglazed surface with numerous irregular undercuts, as shown on an enlarged scale at 8 in Figure 3, over the entire surface 7. The material forming the denture base or tooth structure supporting part 6 is molded upon the roughened surface 7, flowing into and hardening in interlocking engagement with the the relatively fine and irregular undercuts as shown at 9 in Figure 3.

The tooth 5 is thus very strongly secured to the tooth structure supporting part 6 over the entire surface 7, as distinguished from the localized and less secure attachment provided by metal pins and large cavities as previously described. It is practically impossible for the denture base or part 6 to separate or peel away from the retention part of the porcelain tooth 5, and consequently a more sanitary denture is assured.

Furthermore, it is thus possible to construct a very thin tooth without thickening the same for anchorage therein of metal retention pins or the like, or for large retention cavities, and the tooth structure is not weakened adjacent the retention means as where metal pins are anchored in the porcelain tooth or a large retention cavity provided therein. There is no checking of the porcelain such as has resulted where the porcelain is fused around such retention pins. The matter of forming the tooth with precious metal collars therein and soldering the pins in such collars is obviated, and there is no weakening of the tooth by considerable grinding as has been the case with a tooth provided with a large retention cavity.

Figure 4:
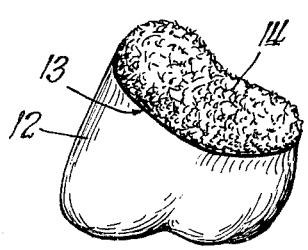
Figure 4 is a perspective view of a posterior tooth provided with retention means embodying the present invention.

In Figure 4 I have shown in perspective and on an enlarged scale a posterior porcelain tooth 12 provided with a surface 13 which is embedded in the material of the denture base or other tooth structure supporting part not shown. This surface 13 is roughened and of generally granular-like form to present a rough and preferably unglazed surface with numerous relatively fine and irregular undercuts as in the preceding embodiment of the invention. The roughened and granular-like retention means on the surface 13 in indicated at 14.

Figure 5:
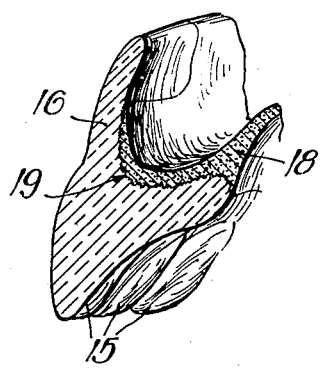
Figure 5 is a vertical section through a gum section and plate or denture base part embodying the present invention.

In Figure 5 I have shown a gum section embodying the retention means of the present invention. This gum section consists of one or more porcelain teeth 15 to which a gum simulating section 16 of porcelain is attached. This gum simulating section 16 preferably has a ceramic glaze resembling the gum tissues. The entire gum section, comprising the tooth or teeth 15 and the gum simulating part 16, is attached to the denture base or plate part 18 by a roughened and generally granular-like surface 19 formed on the gum section 15, 16, similar to the roughened surfaces 7 and 13 of the preceding embodiments of the invention and with the same advantageous results previously described.

The roughening of the retention surfaces may be produced in various ways. First, small ceramic fragments which serve as retention means may be baked onto the surfaces 7, 13 and 19 of the green or vitrified porcelain tooth structure. The resulting surfaces resemble the surface of emery paper. Second, I contemplate treating the green porcelain surfaces which are to form the roughened retention surfaces with metallic oxides, minerals or fluxes. The green porcelain surfaces absorb such metallic oxides, minerals or fluxes, which results in small local shrinkage cracks or frothing upon firing, and thus provides a rough surface with innumerable relatively fine and irregular undercuts. Third, a mixture of the tooth porcelain, cork, which is one illustrative material which will burn out upon firing, and a ceramic material, which slightly increases the fusing point of the porcelain and prevents glazing, and materials like Ball clay, finely ground; asbestos; diglycol stearate or a gum, is added to facilitate the application of the retention material. This retention material is applied to the retention surface of the tooth or gum section, either in the green stage in the bisque or in the fired condition, and heated to approximately the fusing point of the tooth porcelain. The cork, which is in the retention mixture, will burn out and leave numerous relatively fine and irregular undercuts.

A typical formula for this form of retention material is as follows:

|   | Grains |
|---|---|
| Ground cork | 2 |
| Tooth porcelain | 15 |
| Ground highly refractory ceramic particles (such as high fusing 'porcelain or sillimanite), 15 to 20 mesh | 15 |

This is mixed with a liquid consisting of one part of silicate of soda and five parts of acidulated water (water to which a small amount of hydrochloric acid is added).

Figure 3:
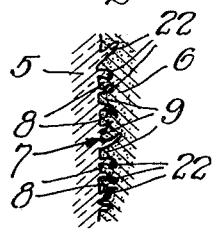
Figure 3 is a fragmentary section on a greatly enlarged scale, showing the character of the roughened retention surface of the tooth and the manner in which the denture base material is locked into engagement with the undercuts of the retention means.

In either case the retention surface which is produced is substantially the same as that shown on an enlarged scale in Figure 3. Each form of retention comprises numerous ceramic projections distributed over the entire extent of the retention surface, and numerous and irregular undercuts as shown at 8 which interlock with and very securely fasten the tooth, gum section, or other tooth structure to the denture base or other tooth structure supporting part.

The porcelain retention projections, indicated at 22 in Figure 3, are preferably unglazed and provide an improvement over the various forms of retention heretofore provided. I do not intend, however, to be limited to an unglazed ceramic retention of this sort, as I have found that glazed ceramic retention of similar character also provides improved results.

Figure 6:
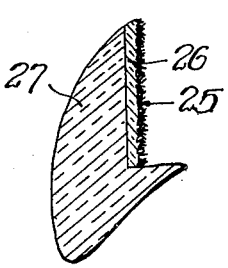
Figure 6 is a sectional similar to Figure 2 showing a further embodiment of the invention.

As a further embodiment of the invention contemplated within the scope of the appended claims, the roughened surface 25, similar to the roughened surfaces of the preceding embodiments of the invention, may be formed on a separate thin porcelain piece 26 as shown in Figure 6. This piece 26 may be applied to the tooth 27 or gum section part with the piece 26 and tooth or gum section part in green form and baked onto the tooth or gum section part in the firehardening of such part or otherwise as suitable or desired.

I do not intend to be limited to the other details shown or described except where the same are expressly recited in the appended claims.

I claim:

1. The method of forming retention means on a porcelain tooth structure which comprises treating the tooth structure with a mixture of the tooth porcelain, cork, and a ceramic material which slightly increases the fusing point of the porcelain and prevents glazing, and heating the tooth structure with said mixture applied thereto to approximately the fusing point of the tooth porcelain, whereupon the cork burns out and leaves numerous undercuts.

2. The method of forming retention means on a porcelain tooth structure which comprises treating the tooth structure with a mixture of the tooth porcelain, a material which will burn out upon firing, and a ceramic material which slightly increases the fusing point of the porcelain and prevents glazing and heating the tooth structure with said mixture applied thereto to approximately the fusing point of the tooth porcelain, whereupon the material which will burn out burns out and leaves numerous undercuts.

REINER W. ERDLE.